US011091697B2

(12) United States Patent
Lewis et al.

(10) Patent No.: US 11,091,697 B2
(45) Date of Patent: *Aug. 17, 2021

(54) DUST SUPPRESSANT AND SOIL STABILIZATION COMPOSITION COMPRISING LIGNOCELLULOSIC BYPRODUCTS

(71) Applicant: Sustainable Fiber Technologies, LLC, Renton, WA (US)

(72) Inventors: Mark Lewis, Renton, WA (US); Sabrina Burkhardt, Renton, WA (US); Jessica Lewis, Renton, WA (US)

(73) Assignee: Sustainable Fiber Technologies, LLC, Renton, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/204,663

(22) Filed: Nov. 29, 2018

(65) Prior Publication Data
US 2019/0161678 A1 May 30, 2019

Related U.S. Application Data

(60) Provisional application No. 62/591,878, filed on Nov. 29, 2017.

(51) Int. Cl.
*C09K 17/50* (2006.01)
*C09K 3/22* (2006.01)
(Continued)

(52) U.S. Cl.
CPC ............ *C09K 17/50* (2013.01); *C09K 3/22* (2013.01); *C09K 17/40* (2013.01); *E02D 3/12* (2013.01);
(Continued)

(58) Field of Classification Search
CPC .......... C09K 17/50; C09K 17/40; C09K 3/22; C09K 17/32; E02D 3/12; E01C 2301/50; E01C 21/00
See application file for complete search history.

(56) References Cited

U.S. PATENT DOCUMENTS

| 2,592,983 A | 4/1952 | Von Hilderbrandt |
| 4,372,811 A | 2/1983 | Samuelson et al. |

(Continued)

FOREIGN PATENT DOCUMENTS

| CA | 2434215 | 1/2004 |
| CA | 2760840 | 3/2011 |

(Continued)

OTHER PUBLICATIONS

International Search Report and Written Opinion for PCT App. No. PCT/US2020/039844 dated Oct. 22, 2020.
(Continued)

*Primary Examiner* — Joseph D Anthony
(74) *Attorney, Agent, or Firm* — Emerson, Thomson & Bennett, LLC; Roger D. Emerson; Peter R. Detorre

(57) ABSTRACT

Provided is a solvent borne dust suppressant or stabilization composition in a solvent which includes, a blend of an inorganic salt and a lignin-carbohydrate mixture, optionally with one or more of a surfactant and crosslinker, wherein the lignin-carbohydrate mixture may be a copolymer and may be present in an amount of 5 weight % to 50 weight % solids, wherein the lignin is a low average molecular weight lignin, the carbohydrate includes hemicellulose and wherein the lignin and hemicellulose are substantially derived from a non-wood source, a wood source or a blend thereof.

11 Claims, 2 Drawing Sheets

(51) Int. Cl.
*E02D 3/12* (2006.01)
*E01C 21/00* (2006.01)
*C09K 17/40* (2006.01)
*C09K 17/32* (2006.01)

(52) U.S. Cl.
CPC .............. *C09K 17/32* (2013.01); *E01C 21/00* (2013.01); *E01C 2301/50* (2013.01)

(56) References Cited

U.S. PATENT DOCUMENTS

| | | |
|---|---|---|
| 4,698,225 A | 10/1987 | Morrison |
| 4,728,393 A | 3/1988 | Peel |
| 4,746,449 A | 5/1988 | Peel |
| 4,786,438 A | 11/1988 | Blackmore |
| 4,824,588 A | 4/1989 | Lin |
| 4,871,825 A | 10/1989 | Lin |
| 4,952,415 A | 8/1990 | Winowiski et al. |
| 4,988,520 A | 1/1991 | Overton |
| 4,996,065 A | 2/1991 | Van de Walle |
| 5,010,156 A | 4/1991 | Cook |
| 5,281,434 A | 1/1994 | Winowiski et al. |
| 5,312,632 A | 5/1994 | Simsa et al. |
| 5,595,628 A | 1/1997 | Gordon et al. |
| 5,786,007 A | 1/1998 | Webb |
| 5,714,184 A | 2/1998 | Major |
| 6,013,116 A | 1/2000 | Major |
| 6,113,974 A | 9/2000 | Winowiski et al. |
| 6,464,827 B1 | 10/2002 | Colodette |
| 6,506,318 B1 | 1/2003 | Sapienza et al. |
| 6,605,232 B1 | 8/2003 | Montgomery et al. |
| 7,070,709 B2 | 7/2006 | Schilling |
| 7,514,018 B2 | 4/2009 | Schilling |
| 8,268,121 B2 | 9/2012 | Blount |
| 8,574,631 B2 | 11/2013 | Anderson |
| 9,133,378 B2 | 9/2015 | Maslow |
| 9,315,427 B2 * | 4/2016 | Foody ........................ C12F 3/10 |
| 2003/0156970 A1 | 8/2003 | Oberkofler et al. |
| 2005/0247907 A1 | 11/2005 | Sapienza et al. |
| 2006/0202156 A1 | 9/2006 | Sapienza et al. |
| 2008/0121356 A1 | 5/2008 | Griffith |
| 2009/0314983 A1 | 12/2009 | Sapienza et al. |
| 2011/0003352 A1 | 1/2011 | Retsina |
| 2012/0108798 A1 | 5/2012 | Wenger et al. |
| 2012/0301598 A1 | 11/2012 | Karges et al. |
| 2013/0175467 A1 | 7/2013 | Bradt et al. |
| 2013/0217868 A1 | 8/2013 | Fackler |
| 2014/0249271 A1 | 9/2014 | Pietarinen |
| 2014/0288526 A1 | 9/2014 | Ters |
| 2014/0315254 A1 | 10/2014 | Gao |
| 2014/0316162 A1 | 10/2014 | Gao |
| 2014/0329999 A1 | 11/2014 | Friedl |
| 2015/0000356 A1 * | 1/2015 | Foody ........................ C05D 9/00 71/8 |
| 2015/0122429 A1 | 5/2015 | Dybov |
| 2015/0203774 A1 | 7/2015 | Lake |
| 2016/0130489 A1 * | 5/2016 | Gilmour ................. E01C 21/00 435/252.5 |
| 2016/0176767 A1 * | 6/2016 | Foody .................... C09K 17/40 71/8 |
| 2016/0229880 A1 | 8/2016 | Pietarinen |
| 2016/0237194 A1 | 8/2016 | Pietarinen |
| 2016/0257791 A1 | 9/2016 | Pietarinen |
| 2017/0226330 A1 | 8/2017 | Knudsen |
| 2018/0002451 A1 | 1/2018 | Ge |
| 2019/0062508 A1 | 2/2019 | Winsness |
| 2019/0091643 A1 | 3/2019 | Lewis |
| 2019/0153280 A1 | 5/2019 | Lewis |

FOREIGN PATENT DOCUMENTS

| | | |
|---|---|---|
| CA | 2936029 | 7/2015 |
| CN | 1042743 | 6/1990 |
| CN | 1438385 | 8/2003 |
| CN | 102746052 | 10/2012 |
| CN | 102704296 | 6/2014 |
| CN | 104628482 | 2/2015 |
| CN | 105130682 | 12/2015 |
| CN | 106495847 | 3/2017 |
| CN | 107382500 | 11/2017 |
| CN | 107417428 | 12/2017 |
| DE | 102009051884 | 5/2011 |
| EP | 2831088 | 8/2017 |
| FR | 2673941 | 9/1992 |
| WO | 2002037981 | 5/2002 |
| WO | 20120137204 | 10/2012 |
| WO | 20140124401 | 8/2014 |
| WO | 2015023580 | 2/2015 |
| WO | 2015104296 | 7/2015 |

OTHER PUBLICATIONS

International Search Report and Written Opinion for PCT App. No. PCT/US2020/039858 dated Oct. 21, 2020.
Lora, Jairo. "Monomers, Polymers and Composites from Renewable Resources", "Chapter 10—Industrial Commercial Lignins: Sources, Properties and Applications" 2008, pp. 225-241.
Lora, J. H. "Lignin Properties and Materials", "Chapter 23—Characteristics and Potential Applications of Lignin Produced by an Organosolv Pulping Process", 1989 American Chemical Society, pp. 312-323.
Nitsos, Christos, "Organosolv Fractionation of Softwood Biomass for Biofuel and Biorefinery Applications", Energies MDPI, Published Dec. 27, 2017.
Pan et al. (Biotechnology and Bioengineering, vol. 94, No. 5, Aug. 5, 2006, p. 851-861) (Year: 2006).
Lindner, Albert and Wegener, Gerd, Characterization of Lignins from Organosolv Pulping According to the Organocell Process Part 1. Elemental Analysis, Nonlignin Portions and Functional Groups, Journal of Wood Chemistry and Technology, vol. 8, 1988—Issue 3, Dec. 13, 2006.
Sun, Run-Cang and Lawther, J. Mark. "Isolation and Characterization of Organosolv Lignins from Wheat Straw". School of Agricultural and Firest Sciences University of Wales, Bangor, Gwynedd, UK, Wood and Fiber Science, 30(1) 1998 pp. 56-63, 1998 Society of Wood Science and Technology.
Lawther, J. Mark; Sun, Run-Cang & Banks, W.B., Isolation and Characterization of Organosolv Lignin under Alkaline Condition from Wheat Straw. International Journal of Polymer Analysis and Characterization vol. 3, 1997, published online Sep. 24, 2006.
"Isolation and Characterization of organosolv lignin under alkaline condition form wheat straw" (J. M. Lawther, R. C. Sun, W. B. Banks, Int. J. of Polymer Analysis and Characterization, 3:2, 159-175 (1997).

* cited by examiner ations and actual loss of road surface. This represents a significant cost in the form of loss of aggregate and increased maintenance time. Much of the need for dust control is on rural, unpaved aggregate roads, but dust control is important in many other areas, such as construction sites, mines, farms, golf courses, parking lots and so forth.

DUST SUPPRESSANT AND SOIL STABILIZATION COMPOSITION COMPRISING LIGNOCELLULOSIC BYPRODUCTS

I. BACKGROUND

A. Field

The present invention relates generally to dust suppressant and aggregate stabilization compositions comprising a sulfur free, lignin-carbohydrate byproduct of cellulose production.

B. Description of the Related Art

The need for treatment of unpaved roads and other outdoor surfaces to reduce airborne dust is well recognized. In addition to reduced driver visibility and adverse health and aesthetic consequences, airborne dust indicates deterioration and actual loss of road surface. This represents a significant cost in the form of loss of aggregate and increased maintenance time. Much of the need for dust control is on rural, unpaved aggregate roads, but dust control is important in many other areas, such as construction sites, mines, farms, golf courses, parking lots and so forth.

Numerous dust control agents have been developed to address these problems. The simplest way to reduce the release of airborne dust is to apply water. However, water alone is a poor dust control agent because its high surface tension decreases its efficiency in coating fine particles and because its rapid evaporation provides a very short useful life. Salt brines also may be used for this purpose. Certain salts are hygroscopic and can absorb moisture from the air, thereby keeping enough water content at the surface to maintain some level of effectiveness. However, the free solubility and low viscosity of the resultant solutions allows the salt to be readily carried off the surface during rainfall.

Other dust control agents have been provided in the art. These agents prevent particulate material from becoming airborne and conventionally function by providing a liquid film that coats and holds particles together. Individual particles become part of an agglomerated collection, which is less likely to take flight due to the increased mass of the collection relative to the individual particles.

Dust control is in most cases a superficial and temporary remediation. Road and/or soil stabilization are more aggressive techniques that involve forming a longer-lasting structure, which incorporates subsurface matter to some depth in combination with an externally applied binder. The binders used for dust control and for road or soil stabilization serve a similar function, with the binding ability or amount of the binder varying across a spectrum.

The art also provides numerous binders that are useful in connection with dust suppression and aggregate (road or soil) stabilization. Known binders for aqueous compositions may be divided roughly into three classes, including lignosulfonate compounds; chloride salts, specifically calcium chloride or magnesium chloride; and synthetic binders. Other types of binders include sugar beet concentrate and molasses which have been used by farmers. Sugar beet concentrate and molasses, however, have been shown to be not as effective in dust suppression as they have a high viscosity (i.e., they are relatively thick) and because they have a relatively high biochemical oxygen demand (BOD).

Of the current products that provide effective dust suppression, certain drawbacks exist, namely poor longevity, environmental toxicity and cost. Many such products that have a desirable useful life are generally considered to be environmentally unsafe. Other products that are more environmentally friendly have a shorter useful life. Synthetic binders that possess a favorable useful life and that do not have serious environmental problems are available, but such products are costly. Oils and oil emulsions are costly, have stickiness concerns and are not environmentally friendly. Molasses-based products can lead to high BOD in storm water from runoff or leaching from the road application.

The prior art teaches lignin compounds derived from a lignosulfonate process. However, these compounds either leave significant residual sulfur in the dust suppressant composition or require extensive processing to remove sulfur. Sulfur is environmentally unfavorable and thus, its inclusion in dust suppressant formulations is disfavored. Other processes to obtain lignin involve the use of anthraquinone, which leaves a residue that is environmentally undesirable.

It is an object of the present disclosure to provide a dust suppressant composition that is highly effective in reducing the generation of airborne particulate matter and that remains effective for a long period of time. It is also an object of the present disclosure to provide a soil stabilization composition.

The dust suppressant and soil stabilization composition disclosed herein incorporates an aqueous lignin and carbohydrate (hemicellulose) dispersion similar to that which is disclosed within U.S. patent application Ser. No. 16/142,683, filed on Sep. 26, 2018, which is hereby incorporated by reference in its entirety. It is submitted that the present dust suppressant and soil stabilization composition provides all the desired properties mentioned above which are sought after in a dust suppressant and soil stabilization composition.

BRIEF DESCRIPTION OF THE INVENTION

According to one embodiment, a dust suppressant and/or aggregate or soil stabilization composition (hereinafter referred to as the "Composition") includes a solvent borne lignin-carbohydrate mixture, optionally with a crosslinking agent and further, optionally, with at least one inorganic salt.

According to one embodiment, the lignin-carbohydrate mixture may include a physical blend of lignin and a carbohydrate, which may be hemicellulose.

According to one embodiment, the lignin-carbohydrate mixture may include a lignin-carbohydrate copolymer, which may be a lignin-hemicellulose copolymer.

According to one embodiment, the Composition may include a solvent borne lignin-carbohydrate mixture, with at least one inorganic salt and, optionally a surfactant.

According to one embodiment, the Composition may include a solvent borne lignin-carbohydrate mixture, with at least one inorganic salt and a crosslinking agent.

According to one embodiment, the Composition includes lignin-carbohydrate mixture in an amount of 5 weight % (or 15 or 20 or 30 weight %) to 35 or 40 or 50 or 60 or 70 weight % solids.

According to one embodiment, the Composition includes lignin in an amount of 10 weight % (or 15 or 20 or 30 or 40 weight %) to 50 or 60 or 70 weight % solids.

According to one embodiment, the lignin may comprise non-condensed lignin oligomers/polymers and monomers.

According to one embodiment, the Composition includes a carbohydrate compound in an amount of 0.1 weight % (or 0.2 or 0.5 or 1.0 or 2.0 or 5.0 weight %) to 20 weight % (or 10 or 15 or 18 or 25 or 30 weight %) solids.

According to another embodiment, the carbohydrate compound may be a hemicellulose compound.

According to another embodiment, the carbohydrate compound may further include an oligosaccharide.

According to an embodiment, at least or greater than 90 weight % (or 95 or 97 or 98 or 99 weight % or substantially all (i.e., greater than 99 weight %) or all) of the lignin and carbohydrate compound may be derived from a non-wood source.

According to another embodiment, the non-wood source of lignin and hemicellulose may include wheat straw, rice straw, barley straw, oat straw, rye grass, coastal Bermuda grass, *Arundo Donax, miscanthus*, bamboo, sorghum, banana harvest residue, pineapple residue, nut shell waste, sugarcane bagasse, industrial hemp, recreational *cannabis* waste, kenaf, switchgrass, succulents, alfalfa, corn stover, and flax straw.

According to one embodiment, the lignin-carbohydrate mixture may include a lignin-hemicellulose copolymer.

According to one embodiment, the Composition may include an inorganic salt in an amount of 1 weight % (or 2.0 or 5.0 weight %) to 20 weight % (or 10 or 15 or 18 weight %) solids.

According to one embodiment, the inorganic salt may be selected from the group consisting of magnesium chloride, calcium chloride, sodium chloride and blends thereof.

According to another embodiment, the crosslinking agent may be selected from borax or acetone/formaldehyde.

According to one embodiment the surfactant may include sodium dodecylbenzene sulfonate, ethoxylated alcohol, sodium lauryl sulfate and blends thereof.

According to one embodiment, the solvent includes water.

According to another embodiment, the solvent may include water and a water-soluble alcohol.

According to another embodiment, the solvent includes a $C_1$-$C_{10}$ alcohol in an amount less than 5% by volume (or 2.5 or 1% by volume) with respect to the solvent.

According to another embodiment, the Composition has a pH within the range of 7-11.

According to another embodiment, the Composition includes less than 1500 parts per million (ppm) (or 1200, or 1100 or 1000 ppm) of sulfur.

According to another embodiment, the Composition may be substantially free of anthraquinone (anthracenedione).

According to yet another embodiment of the invention, the Composition may include a liquor byproduct of cellulose pulp processing.

Also provided are methods of inhibiting or suppressing dust from a surface by applying a Composition according to the present disclosure.

Also provided are methods of stabilizing a particulate agglomeration by applying a Composition according to the present disclosure.

In one embodiment, the method may include the step of spraying a Composition according to the present disclosure onto a surface bearing dust particles.

According to certain aspects of the present disclosure, a dust suppressant and soil stabilization composition which includes a solvent borne blend of solids is provided. The solids include: (i) an inorganic salt in an amount of 1 weight % (or 2.0 or 5.0 weight %) to 20 weight % (or 10 or 15 or 18 weight %) solids, (ii) a lignin-carbohydrate mixture in an amount of 5 weight % (or 15 or 20 or 30 weight %) to 35 or 40 or 50 or 60 or 70 weight % solids, wherein the solvent includes a. water, and b. less than 5% by volume (or 2.5 or 1% by volume) with respect to the solvent of a $C_1$-$C_{10}$ alcohol, wherein the Composition has a pH in the range of 7.0 to 11.

According to further aspects of the present disclosure, the dust suppressant and soil stabilization Composition includes less than 1500 parts per million (ppm) (or 200, or 100 or 50 ppm) of sulfur.

According to further aspects of the present disclosure, the lignin-carbohydrate mixture includes (i) lignin in an amount of 10 weight % (or 15 or 20 or 30 or 40 weight %) to 50 weight % with respect to total solids, and (ii) hemicellulose in an amount of 0.1 weight % (or 0.2 or 0.5 or 1.0 or 2.0 or 5.0 weight %) to 20 weight % (or 10 or 15 or 18 or 25 or 30 weight %) with respect to total solids.

According to further aspects of the present disclosure, the lignin includes an average molecular weight of less than 3500 Da (or 2500 or 1500 Da).

According to further aspects of the present disclosure, the lignin-carbohydrate mixture includes a lignin-hemicellulose copolymer.

According to further aspects of the present disclosure, the lignin-carbohydrate mixture includes a lignin-hemicellulose blend.

According to further aspects of the present disclosure, the solids is substantially free of monosaccharides in that the solids comprise no monosaccharides or monosaccharides in an amount of less than 0.1 weight % (or 0.2 or 0.5 or 1.0 or 2.0 weight %) solids.

According to further aspects of the present disclosure, the Composition is substantially free of anthraquinone (anthracenedione).

According to further aspects of the present disclosure, the inorganic salt is selected from the group consisting of magnesium chloride, calcium chloride, potassium chloride and sodium chloride and blends thereof or the inorganic salt may be replaced with an organic compound selected from the group of Calcium Magnesium Acetate ($CaMg_2(CH_3COO)_6$), Potassium Acetate ($CH_3COOK$), Potassium Formate ($CHO_2K$), Sodium Formate ($HCOONa$), Calcium Formate ($Ca(HCOO)_2$), Urea ($CO(NH_2)_2$, (a common fertilizer) also used as additives to sodium chloride), Methanol ($CH_4O$), Ethanol ($CH_3CH_2OH$, often abbreviated as $C_2H_5OH$ or $C_2H_6$, Ethylene Glycol ($C_2H_6O_2$), Propylene Glycol ($C_3H_8O_2$), or Glycerol ($C_3H_8O_3$) (or glycerine, glycerin) and blends thereof.

According to further aspects of the present disclosure, the surfactant is present in an amount of 0.1 weight % (or 0.5 or 1.0 or 2.0 or 5.0 weight %) to 10 weight % (or 6.0 or 8.0 weight %) with respect to the total weight of the Composition.

Also provided is a method of agglomerating dust on a surface. The method includes the step of applying to the dust on a surface a solvent borne blend of solids which includes: (i) an inorganic salt in an amount of 1 weight % (or 2.0 or 5.0 weight %) to 20 weight % (or 10 or 15 or 18 weight %) solids, (ii) a lignin-carbohydrate copolymer in an amount of 5 weight % (or 15 or 20 or 30 weight %) to 35 or 40 or 50 or 60 or 70 weight % solids, wherein the solvent includes water, wherein the Composition includes less than 1500 parts per million (ppm) (or 200, or 100 or 50 ppm) of sulfur, and wherein the composition is substantially free of anthraquinone.

According to further aspects of the present disclosure, the Composition is neutral to alkaline.

According to further aspects of the present disclosure, greater than 90 weight % (or 95 or 97 or 98 or 99 weight %) of the carbohydrate comprises hemicellulose.

According to further aspects of the present disclosure, substantially all of the hemicellulose and lignin are derived from a non-wood source.

In one embodiment, the particulate agglomerate may be a soil or sand mixture.

Still other aspects and features of the dust suppressant and soil stabilization Composition are described in further detail below.

DETAILED DESCRIPTION

The present disclosure provides a dust suppressant and/or aggregate stabilization composition which includes a solvent borne mixture of solids dispersed or suspended in a solvent, wherein the solids include a lignin-carbohydrate mixture, which, for purposes of the present disclosure may encompass a physical blend of lignin and a carbohydrate and/or a copolymer of lignin and a carbohydrate. The compositions of the present disclosure optionally further include one or more inorganic salts, crosslinking agents, and/or surfactants and the solvent comprises water and optionally an alcohol.

As described below, the carbohydrate may include hemicellulose. For purposes herein, the term "hemicellulose" refers to the polysaccharides and oligosaccharides from wood and non-wood sources.

Solids

As previously noted, the solids portion of the compositions of the present invention comprise a lignin-carbohydrate mixture. The lignin-carbohydrate mixture will generally comprise a lignin-hemicellulose mixture, which may include a physical blend of lignin and hemicellulose or a lignin-hemicellulose copolymer.

Lignin-Hemicellulose Mixture

The compositions of the present disclosure include a lignin-carbohydrate mixture in an amount of 5 weight % (or 15 or 20 or 30 weight %) to 35 or 40 or 50 or 60 or 70 weight % solids.

The lignin component of the lignin-carbohydrate mixture may be derived from any of a variety of wood and non-wood sources through a number of processes to separate lignin from cellulose pulp. The distinction between wood and non-wood sources of lignin is known in the art and is not further delineated herein. In a particularly useful embodiment, the lignin may be derived from a non-wood source. In another embodiment, greater than 80 or 85 or 90 or 95 or 99 weight % of the lignin may be derived from a non-wood source. In still a further embodiment, all or substantially all (i.e., greater than 99 weight %) of the lignin may be derived from a non-wood source. Particularly useful non-wood sources of lignin may include agricultural products and grasses and may include species such as wheat straw, rice straw, barley straw, oat straw, rye grass, coastal Bermuda grass, *Arundo Donax, miscanthus*, bamboo, sorghum, banana harvest residue, pineapple residue, nut shell waste, sugarcane bagasse, industrial hemp, recreational *cannabis* waste, kenaf, switchgrass, succulents, alfalfa, corn stover, and, flax straw. Lignin from wood sources may include lignin derived from hardwood and softwood species.

Figure 1:
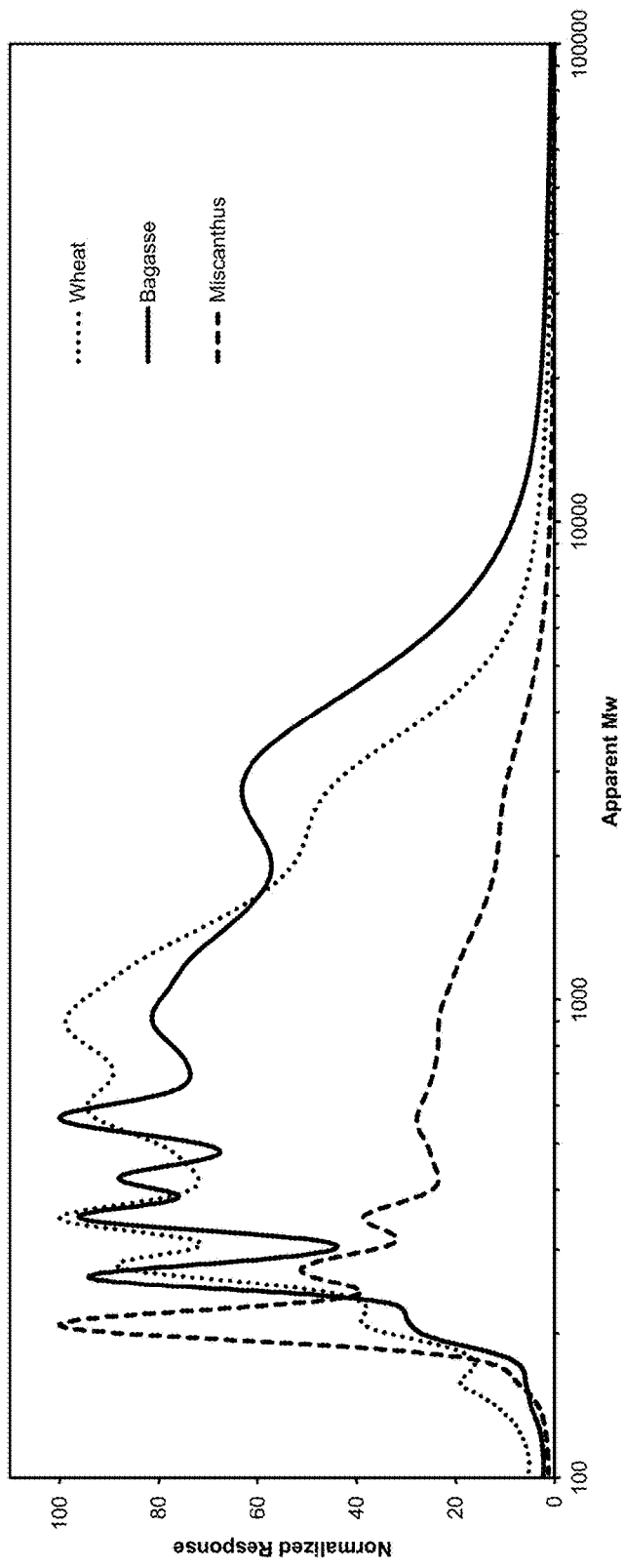
FIG. 1 is a graph which shows the number average molecular weight, weight average molecular weight, and polydispersity of wheat, bagasse and *miscanthus*.
Figure 2:
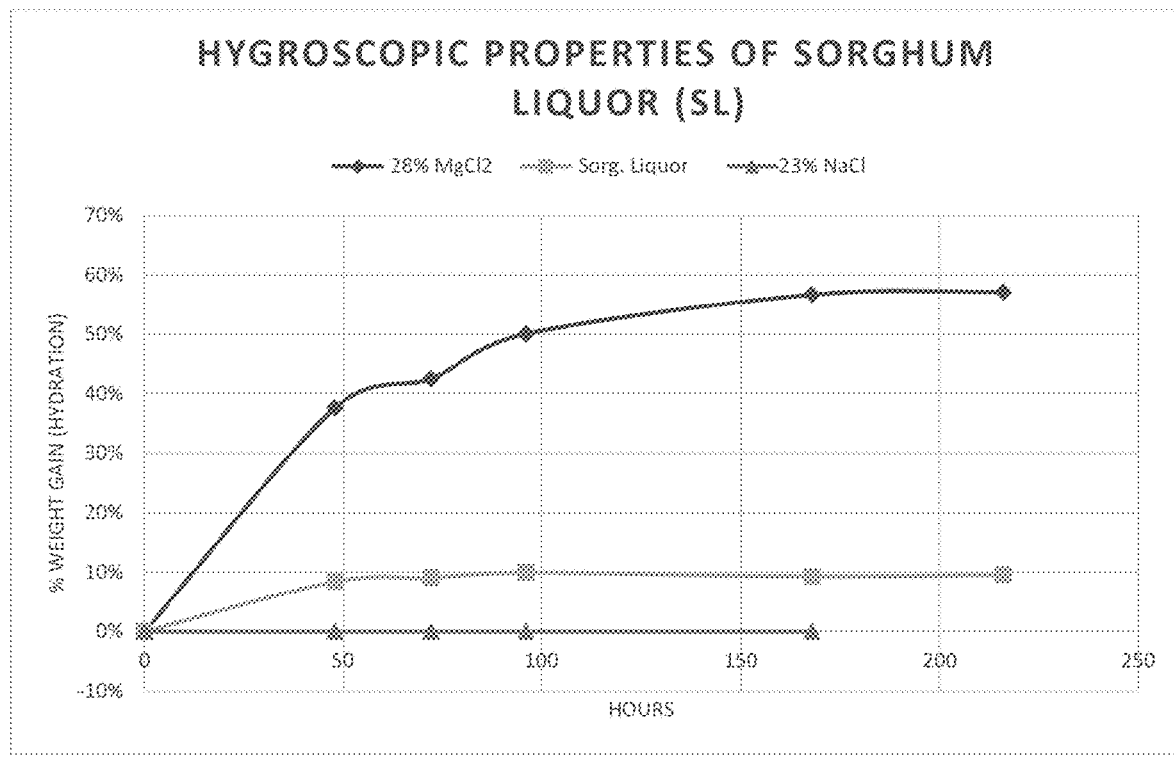
FIG. 2 is a graph which shows the hygroscopic properties of an exemplary dust suppressant/soil stabilization composition according to the present disclosure and the hygroscopic properties of two comparative examples.

Lignin molecular weight is known to vary in spent pulping liquors. As the lignin increases in molecular weight, it may precipitate out of solution or cause increases in viscosity which may cause challenges in spraying the dust suppressant or soil stabilization composition. Without the addition of polyelectrolytic functional groups, such as sulfonic groups, lignin becomes less soluble in water at increasing molecular weights. However, in certain embodiments, it is also desirable to keep the amount of sulfur within the composition relatively low to minimize or eliminate toxicity associated with sulfur-containing compounds. Accordingly, in some embodiments, the average molecular weight of the lignin provided in the dust suppressant or soil stabilization composition may not exceed 3500 Da (or 2500 or 1500 Da) and will include less than 0.01% by weight of sulfonic groups. For example, the weight average molecular weight distribution of wheat straw, bagasse and *miscanthus* is provided within FIG. 1.

The solids of the present disclosure will further include a carbohydrate compound, which in one embodiment, may include hemicellulose, that is, polysaccharides and oligosaccharides derived from wood or non-wood sources. For purposes herein, the term hemicellulose does not include monosaccharides. The hemicellulose component of the solids may be derived from any of a variety of wood and non-wood sources through a number of processes used to separate hemicellulose from cellulose pulp. The distinction between wood and non-wood sources of hemicellulose is known in the art and is not further delineated herein. In a particularly useful embodiment, the hemicellulose may be derived from a non-wood source. In another embodiment, greater than 80 or 85 or 90 or 95 or 99 weight % of the hemicellulose may be derived from a non-wood source. In still a further embodiment, all or substantially all (i.e., greater than 99 weight %) of the hemicellulose may be derived from a non-wood source. Particularly useful non-wood sources of hemicellulose may include agricultural products and grasses and may include species such as wheat straw, rice straw, barley straw, oat straw, rye grass, coastal Bermuda grass, *Arundo Donax, miscanthus*, bamboo, sorghum, banana harvest residue, pineapple residue, sugarcane bagasse, nut shell waste, industrial hemp, recreational *cannabis* residue, kenaf, switchgrass, succulents, alfalfa, corn stover, and, flax straw. Hemicellulose from wood sources may include hemicellulose derived from hardwood and softwood species.

In one embodiment, the hemicellulose compound and lignin may be derived from the same source, which may be a non-wood or wood source or blend thereof.

Whether provided as a blend or copolymer, the lignin-carbohydrate mixture may include (on a total solids basis) lignin in an amount of 10 weight % (or 15 or 20 or 30 or 40 weight %) to 50 weight % solids and a carbohydrate compound in an amount of 0.1 weight % (or 0.2 or 0.5 or 1.0 or 2.0 or 5.0 weight %) to 20 weight % (or 10 or 15 or 18 or 25 or 30 weight %) solids.

Within the lignin-carbohydrate mixture, the ratio (by weight) of lignin to hemicellulose may be from 20:1 to 1:1.

While the present disclosure contemplates that the components of the solids in the dust-suppressant or stabilization composition may be derived from wood and non-wood sources, the present disclosure may be practiced using synthetic sources of lignin and hemicellulose.

The solids portion of the dust-suppressant or stabilization composition may in addition to the lignin-carbohydrate mixtures, further include an inorganic salt in an amount of 1 weight % (or 2.0 or 5.0 weight %) to 20 weight % (or 10 or 15 or 18 weight %) solids.

Suitable inorganic salts for use in the present disclosure may include one or more of magnesium chloride, calcium chloride, potassium chloride and sodium chloride and blends thereof. In one embodiment, the inorganic salt may be selected from magnesium chloride and calcium chloride and mixtures thereof. In another embodiment, the inorganic salt may be magnesium chloride, sodium chloride, or calcium chloride.

While the present invention contemplates the use of inorganic salts, in other embodiments of the invention, all or a portion of the inorganic salt may be replaced with an organic compound such a compound selected from one or more of Calcium Magnesium Acetate ($CaMg_2(CH_3COO)_6$), Potassium Acetate ($CH_3COOK$), Potassium Formate ($CHO_2K$), Sodium Formate ($HCOONa$), Calcium Formate ($Ca(HCOO)_2$), Urea ($CO(NH_2)_2$, (a common fertilizer) also used as additives to sodium chloride), Methanol ($CH_4O$), Ethanol ($CH_3CH_2OH$, often abbreviated as $C_2H_5OH$ or $C_2H_6$, Ethylene Glycol ($C_2H_6O_2$), Propylene Glycol ($C_3H_8O_2$), or Glycerol ($C_3H_8O_3$) (or glycerine, glycerin).

Solvent

The solvent of the dust-suppressant or stabilization composition may, in many useful embodiments, include water. In still other embodiments, the solvent may include water and up to 10% by volume of a water miscible alcohol. In still another embodiment, the solvent may include less than 5% by volume (or 2.5 or 1% by volume) with respect to the solvent of a $C_1$-$C_{10}$ alcohol. In some embodiments, the solvent may be substantially free of a water miscible alcohol or a $C_1$-$C_{10}$ alcohol or contain no water miscible alcohol or a $C_1$-$C_{10}$ alcohol.

Other Additives

Other additives in the dust-suppressant or stabilization composition may include surfactants and crosslinking agents.

Useful surfactants may include sodium dodecylbenzene sulfonate, ethoxylated alcohol and sodium lauryl sulfate. The surfactant may be used in an amount of 0.1 weight % (or 0.5 or 1.0 or 2.0 or 5.0 weight %) to 10 weight % (or 6.0 or 8.0 weight %) with respect to the total weight of the composition.

Crosslinking agents, such as borax or acetone/formaldehyde, may be used in conjunction with the composition of the present disclosure.

The dust-suppressant or stabilization composition may include sulfur in an amount not more than 1500 parts per million (ppm) (or 1200 or 1000 or 500, or 100 or 50 ppm) of the total weight of the composition. In some embodiments, the composition may be substantially free of sulfur (i.e., the dust-suppressant or stabilization composition may contain no sulfur to less than 50 ppm sulfur). In some instances, the composition may include sulfur, wherein the source of the sulfur is the same as the source of the lignin. In this respect, sulfur derived from wood or non-wood pulp sources may be included in the dust-suppressant or stabilization composition.

The dust-suppressant or stabilization composition of the present invention will further be substantially free of anthraquinone (anthracenedione) in that it contains no anthraquinone to less than 0.1 weight % (or 0.2 or 0.5 or 1.0 or 2.0 weight %) anthraquinone of the total weight of the composition. Anthraquinone is often utilized in the processing of wood and non-wood pulp sources.

The dust-suppressant or stabilization composition of the present disclosure may be neutral to alkaline, that is, having a pH of about 7.0 or greater than 7.0. In some embodiments, the pH may be greater than 7.8 or 8.0 or 8.2 or 8.5. In some embodiments, the pH of the dust-suppressant or stabilization composition may be between about 8 and about 11. To increase the pH of the Composition to the desired alkaline range, the Composition may include basic compounds in an amount suitable to adjust the pH of the Composition. A variety of basic compounds may be used. Exemplary basic compounds agents may include alkali metal carbonate and bicarbonate, such as sodium bicarbonate and calcium carbonate, hydroxide ion sources as alkali metal hydroxides, including, without limitation, sodium hydroxide, lithium hydroxide, and potassium hydroxide.

The dust-suppressant or stabilization composition of the present disclosure may be prepared by mixing the solids and solvent in a suitable container and blending or agitating the mixture until the stable dispersion is achieved. As noted above, the pH of the Composition may be modified by addition of a suitable basic compound.

In another embodiment, the lignin and hemicellulose of the dust-suppressant or stabilization composition of the present disclosure may be derived from the processing of wood or non-wood pulp source materials. While many processes for separating cellulose from lignin and hemicellulose are known, the present disclosure is directed to compositions comprising the lignin and hemicellulose byproducts of such processes. It is known that some processes for separating cellulose from lignin and hemicellulose involve dissolving lignin and hemicellulose from wood or non-wood sources using a solvent of some sort; however, these byproducts will typically exceed one or more of the sulfur, anthraquinone, or pH limits taught herein. Moreover, pulping processes that involve use of high temperatures (greater than about 150° C. typically yield byproducts that evidence high levels of highly condensed lignin which lead to higher average molecular weights.

In still another embodiment, the solvent of the dust-suppressant or stabilization composition of the present disclosure may include a portion of the fluid used in processing the wood or non-wood source from which at least a portion of the lignin and hemicellulose solids in the dust-suppressant or stabilization composition was derived. In some embodiments, all or substantially all of the solvent may be drawn from the fluid used in processing the wood or non-wood source from which all or substantially all of the lignin and hemicellulose solids in the dust-suppressant or stabilization composition was derived.

Dust Suppressant/Soil Stabilization Compositional Examples Compositional analyses were conducted on wheat straw concentrate and hemp liquor as a dust suppressant/soil stabilization composition. The results of the analyses are provided within Tables 1 through 4 below. It is noted that the mass closure for the solids analyses were within expectations. Liquor analysis was shown to have a lower mass closure compared with the mass balance expectations. Also, the liquor analysis did not capture, salts, proteins or components not specifically listed in Tables 1 through 4 below.

TABLE 1

| | Sample ID | % TS Slurry | % TS liqour | FIS (dry solids/ Dry Slurry) | FIS (Dry solids/ Wet slurry) | dry Slurry (g) (Slurry Mass Balance) | water (g) | Washed Solids (g) (Solids Mass Balance) | Wet Liquors (g) | Wet Liquors (L) | Dry Liquor (g) (Filtered Liquor Mass Balance) |
|---|---|---|---|---|---|---|---|---|---|---|---|
| | | | | Fraction Insoluble Solids | | | | | | | |
| As measured | Wheat Straw Concentrate | 21.80% | 21.43% | 2.18% | 0.47% | 21.80 | 78.20 | 0.47 | 99.53 | 0.11 | 21.33 |
| | Hemp Liquor | 8.36% | 7.50% | 0.00% | 0.00% | 8.36 | 91.64 | — | 100.00 | 0.10 | 7.50 |
| g constituent/g wet slurry | Wheat Straw Concentrate | | | | | | | | | | |
| | Hemp Liquor | | | | | | | | | | |

It is noted that hemp liquor likely retained water even after lengthy drying period as the sample remained sticky.

TABLE 2

| | Sample ID | % Ash | % Protein | % Lignin | % Glucan | % Xylan | % Galactan | % Arabinan | % Fructan | % Acetate | Total % |
|---|---|---|---|---|---|---|---|---|---|---|---|
| | | Solids Analysis | | | | | | | | | |
| As measured | Wheat Straw Concentrate | 75.00 | 0.00 | 14.59 | 3.87 | 0.22 | 0.00 | 0.50 | 0.00 | 0.20 | 94.38 |
| | Hemp Liquor | 0.00 | 0.00 | 0.00 | 0.00 | 0.00 | 0.00 | 0.00 | 0.00 | 0.00 | 0.00 |
| g constituent/g wet slurry (included in mass balance) | Wheat Straw Concentrate | 0.36 | 0.00 | 0.07 | 0.02 | 0.00 | 0.00 | 0.00 | 0.00 | 0.00 | 0.45 solids mass balance |
| | Hemp Liquor | 0.00 | 0.00 | 0.00 | 0.00 | 0.00 | 0.00 | 0.00 | 0.00 | 0.00 | 0.00 solids mass balance |

TABLE 3

| | Sample ID | Density (g/ml) | Undiluted pH | Lignin (mg/ml) | Cellobiose (mg/ml) | Glucose (mg/ml) | Xylose (mg/ml) | Galactose (mg/ml) | Arabinose (mg/ml) | Fructose (mg/ml) | Glucose (mg/ml) | Xylose (mg/ml) | Galactose (mg/ml) | Arabinose (mg/ml) | Fructose (mg/ml) |
|---|---|---|---|---|---|---|---|---|---|---|---|---|---|---|---|
| | | Liquor Analysis | | | | | | | | | | | | | |
| | | | | | Monomeric carbohydrates | | | | | | Total carbohydrates | | | | |
| As measured | Wheat Straw Concentrate | 1.0888 | 9.34 | 13.38 | 0.0 | 0.0 | 0.0 | 0.0 | 0.0 | 0.0 | 0.0 | 0.4 | 0.3 | 1.5 | 0.0 |
| | Hemp Liquor | 1.0168 | 11.66 | 3.998 | 0.0 | 0.0 | 0.0 | 0.0 | 0.0 | 0.0 | 1.3 | 2.8 | 1.5 | 1.5 | 0.0 |
| g constituent/g wet slurry | Wheat Straw Concentrate | | | 1.2 | 0.0 | 0.0 | 0.0 | 0.0 | 0.0 | 0.0 | 0.0 | 0.0 | 0.0 | 0.1 | 0.0 |
| | Hemp Liquor | | | 0.4 | 0.0 | 0.0 | 0.0 | 0.0 | 0.0 | 0.0 | 0.1 | 0.3 | 0.2 | 0.1 | 0.0 |

TABLE 4

| | Sample ID | Lactic Acid (mg/ml) | Glycerol (mg/ml) | Acetic Acid (mg/ml) | Ethanol (mg/ml) | HMF (mg/ml) | Furfural (mg/ml) | Filtered Liquor Mass Balance | Slurry Mass Balance |
|---|---|---|---|---|---|---|---|---|---|
| | | Liquor Analysis Organic Acids after hydrolysis | | | | | | | |
| As measured | Wheat Straw Concentrate | 20.2 | 0.0 | 46.0 | 0.0 | 0.0 | 0.0 | | |
| | Hemp Liquor | 1.2 | 0.0 | 10.0 | 0.0 | 0.0 | 0.0 | | |
| g constituent/g wet slurry (Included in Mass Balance) | Wheat Straw Concentrate | 1.8 | 0.0 | 4.2 | 0.0 | 0.0 | 0.0 | 7.5 | 7.9 |
| | Hemp Liquor | 0.1 | 0.0 | 1.0 | 0.0 | 0.0 | 0.0 | 2.2 | 2.2 |

INDUSTRIAL APPLICATION

The dust-suppressant or stabilization composition of the present disclosure may be applied to surfaces that are dusty or prone to emitting dust or other fine particulate matter into the air, including, without limitation, road surfaces, mines, tailing piles, agricultural lands, and the like.

The dust-suppressant or stabilization composition of the present disclosure may also be applied to agglomerate particulate materials, such as sand.

Solvent borne dust-suppressant or stabilization composition according to the present disclosure may be applied to a surface by spraying.

Biochemical Oxygen Demand

Biochemical oxygen demand (also referred to as biological oxygen demand) refers to the amount of dissolved oxygen required by aerobic microbiological organisms to break down organic material that is present within a liquid sample at a certain temperature over a certain period of time. Non-wood sources of lignin and hemicellulose such as wheat straw liquor are readily suitable for use within dust suppressant and soil stabilization compositions. This is due to their relatively low biochemical oxygen demand compared to other materials which allows for easier degradation. For example, the biochemical oxygen demand for wheat straw liquor ranges from about 10,700 mg/L to about 12,700 mg/L. Other comparable materials such molasses and sugar beet concentrate have much a higher biochemical oxygen demand. For example, the biochemical oxygen demand of molasses is approximately 900,000 mg/L. Sugar beet concentrate exhibits a biochemical oxygen demand at levels which are similar to that of molasses. Without being bound to any particular theory, the difference in biochemical oxygen demand for non-wood sources of lignin and hemicellulose such as wheat straw liquor compared to other materials such as molasses and sugar beet concentrate are believed to be due to the elimination or substantial elimination of monosaccharaides from the non-wood source of lignin and hemicellulose.

Hygroscopic Properties

The dust suppressant or stabilization composition exhibits good hygroscopicity in that it is capable of absorbing moisture from the air to keep the surface to which it is applied to damp. An example of the hygroscopic properties exhibited a dust suppressant according to the present disclosure in the form of a sorghum liquor is provided below.

A sorghum liquor (SL) was received as a dark semi-viscous liquid. The sorghum liquor included an inorganic salt in an amount from 1 weight % to 20 weight % solids, a lignin-carbohydrate mixture in an amount from 5 weight % to 70 weight % solids and a solvent. The solvent used with the sorghum liquor included water and less than 5% by volume of a $C_1$-$C_{10}$ alcohol. The sorghum liquor had a pH in the range of 7.0 to 11. This sorghum liquor was mixed well. Approximately 21 grams of sorghum liquor were then transferred to a tared aluminum weighing tin. Similar amounts of 28% $MgCl_2$ and 23% NaCl as comparative solutions were also transferred to separate weighing tins. These samples were evaporated to dryness by gently heating on a hot plate to provide in the case of SL, a glassy reddish brown solid; and in the case of $MgCl_2$ and NaCl a crystalline white material. These samples were then further dehydrated in a laboratory oven at 215° F. for 12 hours.

The samples mentioned above were then removed from the oven and immediately weighed to determine an initial solid content weight. The samples were then placed in a constant humidity chamber prepared using a saturated solution of magnesium chloride. The temperature and humidity were recorded. Under these conditions a static environment of 68° F. and 35% relative humidity (RH) was achieved. Weight of the samples was recorded at intervals and the data recorded.

TABLE 5

Weight Gain of Dust Suppressants at 35% RH

| Hours | % Gain 28% MgCl2 | % Gain SL | % Gain 23% NaCl |
|---|---|---|---|
| 0 | 0% | 0% | 0% |
| 48 | 37.6% | 8.4% | 0.0% |
| 72 | 42.4% | 9.1% | 0.0% |
| 96 | 50.0% | 10.0% | 0.0% |
| 120 | | | |
| 144 | | | |
| 168 | 56.7% | 9.3% | 0.0% |
| 192 | | | |
| 216 | 57.1% | 9.6% | |

This study was done to provide a quick determination of the hygroscopic behavior of a process byproduct obtained from a pulping operation. The conditions chosen, namely 68° F. and 35% RH were selected to represent a plausible environment for dust control product applications. Two reference products, NaCl and $MgCl_2$ were included in the study as comparative products. $MgCl_2$ is an established dust palliative with strong hygroscopic behavior and NaCl is a product which exhibits very low hygroscopic tendencies. Under these conditions the SL material exhibited modest hygroscopic properties, gaining about 9.5% moisture weight within the first 48 hours.

While the dust suppressant and soil stabilization composition and associated methods have been described above in connection with various illustrative embodiments, it is to be understood that other similar embodiments may be used, or modifications and additions may be made to the described embodiments for performing the same function disclosed herein without deviating therefrom. Further, all embodiments disclosed are not necessarily in the alternative, as various embodiments may be combined or subtracted to provide the desired characteristics. Variations can be made by one having ordinary skill in the art without departing from the spirit and scope and process hereof. Therefore, the dust suppressant and soil stabilization composition and corresponding methods should not be limited to any single embodiment, but rather construed in breadth and scope in accordance with the recitations of the appended claims.

Having thus described the dust suppressant and soil stabilization composition, it is now claimed:

What is claimed is:

1. A dust suppressant and soil stabilization composition comprising a solvent borne blend of solids, the solids comprising:
   (i) an inorganic salt in an amount of 1 or 2.0 or 5.0 weight % to 20 or 10 or 15 or 18 weight % in regards to the total weight of the dust suppressant and soil stabilization composition,
   (ii) a lignin-carbohydrate mixture in an amount of 10.0 or 15 or 20 or 30 to 35 or 40 or 50 or 60 or 70 weight % in regards to the total weight of the dust suppressant and soil stabilization composition,
wherein the lignin-carbohydrate mixture comprises-
   (i) lignin in an amount of 10 or 15 or 20 or 30 or 40 weight % to 50 weight % in regards to the total weight of the dust suppressant and soil stabilization composition, and
   (ii) hemicellulose in an amount of 0.1 or 0.2 or 0.5 or 1.0 or 2.0 or 5.0 weight % to 20 or 10 or 15 or 18 or 25 or 30 weight % in regards to the total weight of the dust suppressant and soil stabilization composition
   wherein the solvent comprises
      a. water, and
      b. less than 5% or 2.5 or 1% by volume with respect to the solvent of a $C_1$-$C_{10}$ alcohol, wherein the composition has a pH in the range of 8.0 to 11,
   wherein pH is achieved by the addition of an alkali metal carbonate, an alkali metal bicarbonate or a hydroxide ion source to the dust suppressant and soil stabilization composition,
   wherein the dust suppressant and soil stabilization composition is substantially free of sulfur,
   wherein the dust suppressant and soil stabilization composition is substantially free of anthraquinone (anthracenedione),
   wherein the dust suppressant and soil stabilization composition does not comprise furfural and hydroxymethylfurfural (HMF) and,
   wherein the lignin is derived from a non-wood source, wherein the non-wood source is selected from the group consisting of wheat straw, rice straw, barley straw, oat straw, rye grass, coastal Bermuda grass, *Arundo Donax, miscanthus*, bamboo, sorghum, banana harvest residue, pineapple residue, sugarcane bagasse, industrial hemp, recreational *cannabis* waste, nut shell residue, kenaf, switchgrass, succulents, alfalfa, corn stover, and flax straw.

2. The dust suppressant and soil stabilization composition of claim 1, wherein the lignin comprises an average molecular weight of less than 3500 or 2500 or 1500.

3. The dust suppressant and soil stabilization composition of claim 2, wherein the lignin-carbohydrate mixture comprises a lignin-hemicellulose copolymer.

4. The dust suppressant and soil stabilization composition of claim 2, wherein the lignin-carbohydrate mixture comprises a lignin-hemicellulose blend.

5. The dust suppressant and soil stabilization composition of claim 1, wherein the solids are substantially free of monosaccharides in that the solids comprise no monosaccharides or monosaccharides in an amount of less than 0.1 or 0.2 or 0.5 or 1.0 or 2.0 weight % solids.

6. The dust suppressant and soil stabilization composition of claim 1, wherein substantially all of the hemicellulose is derived from a non-wood source.

7. The dust suppressant and soil stabilization composition of claim 6, wherein the non-wood source of hemicellulose is selected from the group consisting of wheat straw, rice straw, barley straw, oat straw, rye grass, coastal Bermuda grass, *Arundo Donax, miscanthus*, bamboo, sorghum, banana harvest residue, nut shell waste, pineapple residue, sugarcane bagasse, industrial hemp, recreational *cannabis* waste, kenaf, switchgrass, succulents, alfalfa, corn stover, and, flax straw.

8. The dust suppressant and soil stabilization composition of claim 1 wherein the inorganic salt is selected from the group consisting of magnesium chloride, calcium chloride, potassium chloride and sodium chloride and blends thereof.

9. The dust suppressant and soil stabilization composition of claim 1, further comprising a surfactant.

10. The dust suppressant and soil stabilization composition of claim 9, wherein the surfactant is present in an amount of 0.1 or 0.5 or 1.0 or 2.0 or 5.0 weight % to 10 or 6.0 or 8.0 weight % with respect to the total weight of the composition.

11. The dust suppressant and soil stabilization composition of claim 1, further comprising a crosslinking agent.

* * * * *